United States Patent
Gorny (12)

(10) Patent No.: US 12,555,059 B2
(45) Date of Patent: *Feb. 17, 2026

(54) SYSTEM AND METHOD OF ASSIGNING AND MANAGING CUSTOMER SERVICE TICKETS USING NATURAL LANGUAGE PROCESSING, MACHINE LEARNING AND TRIVIALITY ANALYSIS

(71) Applicant: Nextiva, Inc., Scottsdale, AZ (US)

(72) Inventor: Tomas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/200,332

(22) Filed: May 22, 2023

(65) Prior Publication Data

US 2023/0289702 A1    Sep. 14, 2023

Related U.S. Application Data

(63) Continuation of application No. 16/680,053, filed on Nov. 11, 2019, now Pat. No. 11,676,093.

(Continued)

(51) Int. Cl.
*G06Q 10/0639* (2023.01)
*G06F 40/20* (2020.01)
(Continued)

(52) U.S. Cl.
CPC ....... *G06Q 10/06395* (2013.01); *G06F 40/20* (2020.01); *G06N 5/04* (2013.01);
(Continued)

(58) Field of Classification Search
None
See application file for complete search history.

(56) References Cited

U.S. PATENT DOCUMENTS 7,184,540 B2    2/2007  Dezonno et al.
8,595,234 B2   11/2013  Siripurapu et al.
(Continued)

FOREIGN PATENT DOCUMENTS

WO       2018006003         1/2018
WO    WO-2018006003 A1  *  1/2018 ......... H04L 41/0631

OTHER PUBLICATIONS

Gustafson Brent, Customer email reply re-opens ticket, freshdesk webpages, Jun. 23, 2015 https://web.archive.org/web/20150623074114/ https://support.freshdesk.com/support/discussions/topics/6085 (Year: 2015).*

(Continued)

*Primary Examiner* — Octavian Rotaru
(74) *Attorney, Agent, or Firm* — Spencer Fane LLP; Steven J. Laureanti

(57) ABSTRACT

A system and method are disclosed for assigning a ticket including one or more databases that store data describing electronic communication between one or more customer system communication devices and one or more service center communication devices. Embodiments further include a computer coupled with one or more databases and configured to monitor communication activity to determine whether a communication channel is opened between one or more customer system communication devices and one or more service center communication devices, responsive to a ticket being opened between one or more customer system communication devices and one or more service center communication devices, analyze the ticket for at least one topic and customer data, search the one or more databases for missing customer data, and in response to detecting missing customer data, identify one or more relationship models that predicts a value for the missing customer data based on known customer data.

11 Claims, 5 Drawing Sheets

Related U.S. Application Data

(60) Provisional application No. 62/758,804, filed on Nov. 12, 2018.

(51) Int. Cl.
*G06N 5/04* (2023.01)
*G06Q 10/0631* (2023.01)
*G06Q 10/067* (2023.01)
*G06Q 30/016* (2023.01)

(52) U.S. Cl.
CPC ............... *G06Q 10/063112* (2013.01); *G06Q 10/063114* (2013.01); *G06Q 10/067* (2013.01); *G06Q 30/016* (2013.01)

(56) References Cited

U.S. PATENT DOCUMENTS

| | | | |
|---|---|---|---|
| 9,229,800 B2 | 1/2016 | Jain et al. | |
| 9,247,061 B2 | 1/2016 | Erhart et al. | |
| 9,256,893 B2 | 2/2016 | Vernick | |
| 9,313,332 B1* | 4/2016 | Kumar | G10L 17/24 |
| 9,635,175 B2 | 4/2017 | Skiba et al. | |
| 9,661,067 B2 | 5/2017 | Seth et al. | |
| 9,767,091 B2 | 9/2017 | Sarikaya | |
| 9,826,095 B2 | 11/2017 | D'arcy et al. | |
| 9,866,693 B2 | 1/2018 | Tamblyn et al. | |
| 9,871,927 B2 | 1/2018 | Perez et al. | |
| 10,002,189 B2* | 6/2018 | Cheyer | G06F 16/367 |
| 10,079,736 B2 | 9/2018 | Bellini et al. | |
| 10,084,918 B2 | 9/2018 | Conway et al. | |
| 10,366,332 B2 | 7/2019 | Bruno et al. | |
| 10,373,171 B2 | 8/2019 | Ryabchun et al. | |
| 10,579,834 B2 | 3/2020 | Walia | |
| 10,706,432 B2* | 7/2020 | Chakraborty | G06Q 30/0202 |
| 10,868,915 B2 | 12/2020 | Buehler et al. | |
| 11,361,337 B2 | 6/2022 | Gupta et al. | |
| 11,625,655 B2 | 4/2023 | Wang et al. | |
| 2004/0101127 A1* | 5/2004 | Dezonno | H04M 3/523 379/265.06 |
| 2004/0162724 A1* | 8/2004 | Hill | G10L 15/22 704/231 |
| 2009/0175180 A1* | 7/2009 | Yang | H04L 41/0681 370/252 |
| 2009/0300493 A1* | 12/2009 | Hamilton, II | G06Q 10/10 715/706 |
| 2011/0010316 A1* | 1/2011 | Hamilton, II | G06N 3/006 709/204 |
| 2012/0131139 A1* | 5/2012 | Siripurapu | H04L 65/60 709/217 |
| 2013/0185050 A1* | 7/2013 | Bird | G06F 16/3329 704/E11.001 |
| 2014/0006861 A1* | 1/2014 | Jain | H04L 41/5074 714/E11.178 |
| 2014/0270145 A1* | 9/2014 | Erhart | H04M 3/5166 379/265.13 |
| 2015/0139415 A1* | 5/2015 | Skiba | H04M 3/5133 379/265.09 |
| 2015/0178371 A1* | 6/2015 | Seth | G06F 40/117 707/755 |
| 2015/0199732 A1* | 7/2015 | Vernick | H04L 67/025 455/415 |
| 2015/0207937 A1* | 7/2015 | D'Arcy | H04M 3/5233 379/265.12 |
| 2015/0347922 A1* | 12/2015 | Hamann | G06N 20/00 706/12 |
| 2016/0036652 A1* | 2/2016 | Bellini, III | G06F 11/00 709/223 |
| 2016/0048772 A1* | 2/2016 | Bruno | G06N 5/04 706/11 |
| 2016/0104094 A1* | 4/2016 | Yom-Tov | G06Q 10/109 705/7.41 |
| 2016/0217124 A1* | 7/2016 | Sarikaya | G06F 40/279 |
| 2016/0247165 A1* | 8/2016 | Ryabchun | G06Q 30/0201 |
| 2017/0024392 A1* | 1/2017 | Shah | G06F 16/24552 |
| 2017/0116177 A1* | 4/2017 | Walia | H04M 7/0045 |
| 2017/0140010 A1* | 5/2017 | Agarwal | G06Q 10/0633 |
| 2017/0214799 A1* | 7/2017 | Perez | H04M 3/5166 |
| 2017/0357890 A1 | 12/2017 | Kim | |
| 2018/0006977 A1* | 1/2018 | Nandi | H04L 51/226 |
| 2018/0025361 A1* | 1/2018 | Ferrarons Llagostera | G06F 16/24578 705/304 |
| 2018/0108062 A1* | 4/2018 | McHale | G06Q 30/0635 |
| 2018/0131811 A1* | 5/2018 | Buehler | H04M 3/5233 |
| 2018/0211260 A1 | 7/2018 | Zhang et al. | |
| 2018/0218374 A1* | 8/2018 | Shah | G06Q 30/016 |
| 2018/0218427 A1* | 8/2018 | Chu | G06Q 30/0631 |
| 2019/0247891 A1* | 8/2019 | Kumar | B07C 5/3422 |
| 2020/0065848 A1* | 2/2020 | Gupta | G06N 5/02 |
| 2020/0151649 A1* | 5/2020 | Wang | G06Q 10/063116 |
| 2022/0207441 A1* | 6/2022 | Arora | G06Q 10/103 |

OTHER PUBLICATIONS

Natural Language Processing, wikipedia, archives org, Nov. 10, 2018 https://web.archive.org/web/20181110195210/https://en.wikipedia.org/wiki/Natural_language_processing (Year: 2018).*

USPTO—Implementation of changes to examining time, application routine, and the examiner PAP (TRP), CPC-based Application Routing and Examination Time, Part 1, 2020, Slides 32, 37 (Year: 2020).*

Manzoni et a, Set-Up-to-Fail Syndrome, Harvard Business Review, Apr. 1998 https://hbr.org/1998/03/the-set-up-to-fail-syndrome (Year: 1998).*

Green Alison, is it unfair to give my best employee more work than everyone else, May 16, 2022 https://www.askamanager.org/2022/05/is-it-unfair-to-give-my-best-employee-more-work-than-everyone-else.html (Year: 2022).*

Kristof Van Kriekingen, Stopping the reopening tickets by a Thank you response, Zendesk help, Mar. 14, 2014 https://support.zendesk.com/hc/en-us/community/posts/203445166-Stopping-the-reopening-tickets-by-a-Thank-you-response-?page=2 (Year: 2014).*

Deny Ticket Re-Open, Zendesk help, support zendesk webpages, May 25, 2017 https://support.zendesk.com/hc/en-us/community/posts/115007962528-Deny-Ticket-Re-Open (Year: 2017).*

International Search Report for Application No. PCT/US19/60763 dated Jan. 28, 2020. 2 Pages.

European Search Report for Application No. EP 19884608 dated Jun. 24, 2022. 9 Pages.

Brent Gustafson, Customer email reply re-opens ticket, freshdesk webpages, Jun. 23, 2015 https://web.archive.org/web/20150623074114/https://support.freshdesk.com/support/discussions/topics/6085 (Year: 2015).

Jean-François Manzoni et al., Set-Up-to-Fail Syndrome, Harvard Business Review, Apr. 1998 https://hbr.org/1998/03/the-set-up-to-fail-syndrome (Year: 1998).

Alison Green, is it unfair to give my best employee more work than everyone else, May 16, 2022 https://www.askamanager.org/2022/05/is-it-unfair-to-give-my-best-employee-more-work-than-everyone-else.html (Year: 2022).

Kristof Van Kriekingen, Stopping the reopening tickets by a Thank you response, Zendesk help, Mar. 14, 2014 https:1/support.zendesk.com/hc/en-us/community/posts/203445166-Stopping-the-reopening-tickets-by-a-Thank-you-response-? page=2 (Year: 2014).

Michael Little, Deny Ticket Re-Open, Zendesk help, support zendesk webpages, May 25, 2017 https://support.zendesk.com/hc/en-us/community/posts/115007962528-Deny-Ticket-Re-Open (Year: 2017).

European Examination Report for Application No. 19 884 608.1 dated Sep. 29, 2025, 7 pages.

* cited by examiner

SYSTEM AND METHOD OF ASSIGNING AND MANAGING CUSTOMER SERVICE TICKETS USING NATURAL LANGUAGE PROCESSING, MACHINE LEARNING AND TRIVIALITY ANALYSIS

CROSS-REFERENCE TO RELATED APPLICATIONS

This application is a continuation of U.S. patent application Ser. No. 16/680,053, filed on Nov. 11, 2019, entitled "Inferring Missing Customer Data in Assigning a Ticket to a Customer, and Preventing Reopening of the Ticket in Response to determining Trivial Data," which claims the benefit under 35 U.S.C. § 119(e) to U.S. Provisional Application No. 62/758,804, filed Nov. 12, 2018, entitled "System and Method of Assigning Customer Service Tickets." U.S. patent application Ser. No. 16/680,053 and U.S. Provisional Application No. 62/758,804 are assigned to the assignee of the present application.

TECHNICAL FIELD

The present disclosure relates generally to customer resource management and specifically to a system and method of assigning tickets to agents of customer service centers.

BACKGROUND

In a customer service center, agents are assigned tickets that represent customer issues that the agents are tasked with resolving. Some agents resolve customer issues more quickly and with higher satisfaction than others. In some cases, the agent may simply be more skilled, efficient, knowledgeable, or friendly than others. However, simply assigning a ticket to the best agents results in the best agents being assigned all of the tickets, while poorer-performing agents may be assigned no tickets at all. The inability to properly assign tickets to agents in manner that increases efficiency and customer satisfaction is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
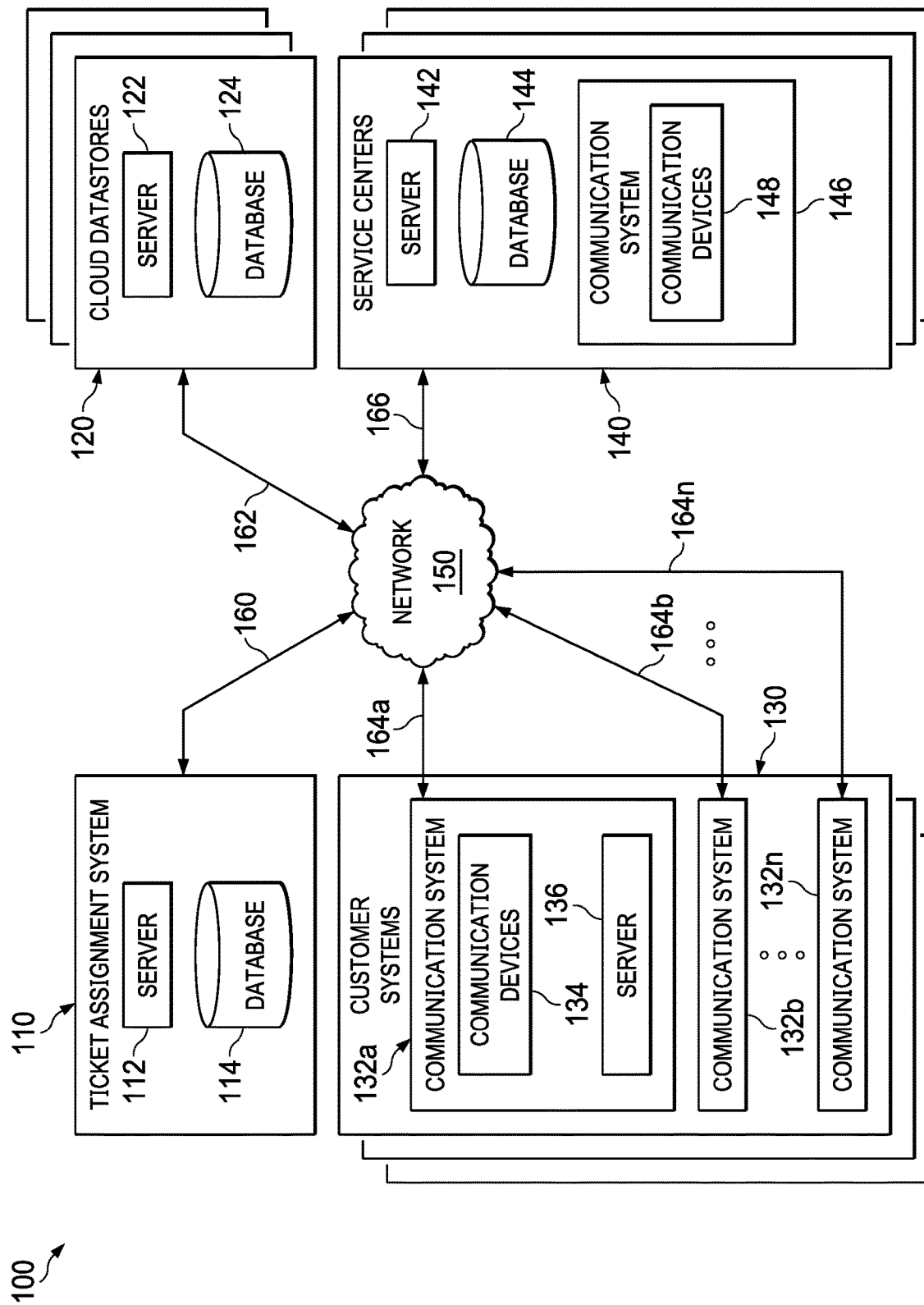
FIG. 1 illustrates an exemplary communication network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates exemplary communication network 100, according to a first embodiment. Communication network 100 comprises ticket assignment system 110, one or more cloud datastores 120, one or more customer systems 130, one or more service centers 140, network 150, and communication links 160-166. Although a single ticket assignment system 110, one or more cloud datastores 120, one or more customer systems 130, one or more service centers 140, a single network 150, and one or more communication links 160-166 are shown and described, embodiments contemplate any number of ticket assignment systems, cloud datastores, customer systems, service centers, networks, or communication links, according to particular needs.

In one embodiment, ticket assignment system 110 comprises server 112 and database 114. Server 112 comprises one or more modules programmed to, among other things, assign tickets to agents of one or more service centers 140, monitor and analyze communication activity between one or more customer systems 130 and one or more service centers 140, and analyze content of one or more telephone calls, emails, instant chat, text messaging, or other electronic communication. Server 112 may comprise any number of one or more servers at one or more locations local to, or remote from, ticket assignment system 110. Database 114 comprises one or more databases or other data storage arrangements at one or more locations, local to, or remote from, ticket assignment system 110. In one embodiment, database 114 is coupled with server 112 by one or more local area networks (LANs), metropolitan area networks (MANs), wide area networks (WANs), network 150 (such as, for example, the Internet), or any other appropriate wire line, wireless, or any other one or more communication links 160-166. Database 114 stores data that is made available and may be used by server 112 according to the operation of communication network 100. As described in further detail below, embodiments of ticket assignment system 110 automatically identify customer issues from communications received from one or more customer systems 130 and resolve the customer issues by assigning tickets to agents of one or more service centers 140. In addition, and as described in more detail below, agents are assigned tickets based, at least in part, a similarity between the customer and the agent and the agent's skill in handling customer issue identified in the ticket.

In another embodiment, one or more cloud datastores 120 comprises server 122 and database 124. One or more cloud datastores 120 provide for the storage of data and hosting of programs or applications. According to embodiments, server 122 of one or more cloud datastores 120 may host and run one or more runtime processes associated with ticket assignment system 110. Server 122 comprises one or more servers configured to access, update, and provide data associated with ticket assignment system 110, one or more customer systems 130, and/or one or more service centers 140. Database 124 comprises one or more databases or other data storage arrangements at one or more locations, local to, or remote from, one or more cloud datastores 120. In one embodiment, database 124 representing one or more databases is coupled with server 122 representing one or more servers using one or more LANs, MANs, WANs, network 150 (such as, for example, the Internet), or any other appropriate wire line, wireless, or any other one or more communication links 160-166. Database 124 stores data that is made available to, and may be used by, one or more customer systems 130 and one or more service centers 140 according to the operation of communication network 100.

In one embodiment, one or more customer systems 130 are associated with one or more customers such as, for example, a buyer, customer, retailer, or other individual, business or enterprise which communicates with one or more service centers 140. One or more customer systems 130 comprise one or more customer communication systems 132a-132n, which send communications to, and receive communications from, one or more service centers 140. Customer communication systems 132a-132n comprise customer communication devices 134 and customer communication server 136. Each customer communication device 134 may provide communication between customers of one or more customer systems 130 and between customers of one or more customer systems 130 and agents of one or more service centers 140. One or more customer systems 130 may be coupled with one or more service centers 140 by network 150 via one or more communication links 164a-164n.

According to embodiments, one or more service centers 140 may be associated with an entity, such as, for example, a business, company, entity, enterprise, distributor, retailer, call-center, CRM specialist system, customer service system, help desk system, telephone or media service, social media service (such as FACEBOOK, TWITTER, or the like), or other like entities that communicate with customers of the one or more service centers 140 or customers of one or more other entities. One or more service centers 140 may comprise server 140 and database 144. Although one or more service centers 140 are illustrated as comprising a single server 140 and a single database 144, embodiments contemplate one or more service centers 140 comprising any suitable number of servers or databases (or other data storage arrangements) at one or more locations which are integral to or separate from the hardware and/or software that supports communication network 100, according to particular needs.

One or more service centers 140 comprise service center communication system 146 that communicates with one or more customer systems 130. Service center communication system 146 comprises service center communication devices 148, which send and receive communications among agents of one or more service centers 140 and customers of one or more customer systems 130. Although one or more service centers 140 are shown and described as comprising a single service center communication system 146, embodiments contemplate one or more service centers 140 comprising any number of one or more service center communication systems, each having any number of one or more service center communication devices 148.

As described in more detail below, communication network 100 may automatically collect data relating to communications within a single service center communication system 146 of a single service center of one or more service centers 140; among more than one service center communication systems 146 located at one or more service centers 140; and among more than one service center communication systems 146 and one or more customer system communication systems 132a-132n. In addition, and as discussed in more detail herein, service center communication systems 146 may each operate on separate computer systems or may operate on one or more shared computer systems. Each of these one or more computer systems may be a workstation, personal computer, network computer, laptop computer, notebook computer, tablet-type device, smartphone, terminal, or other suitable networked communication device. Embodiments contemplate other communication devices, including, for example, land-line or VoIP telephones, telephone systems, and the like, as described in more detail herein.

Ticket assignment system 110 is coupled with network 150 using communication link 160, which may be any wireline, wireless, or other link suitable to support data communication between ticket assignment system 110 and network 150. One or more cloud datastores 120 is coupled with network 150 using communication link 162, which may be any wireline, wireless, or other link suitable to support data communication between one or more cloud datastores 120 and network 150. One or more customer systems 130 are coupled with network 150 using one or more communication links 164a-164n, which may be any wireline, wireless, or other link suitable to support data communication between one or more customer systems 130 and network 150. One or more service centers 140 are coupled with network 150 using communication link 166, which may be any wireline, wireless, or other link suitable to support data communication between one or more service centers 140 and network 150. Although communication links 160-166 are shown and described as generally coupling ticket assignment system 110, one or more cloud datastores 120, one or more customer systems 130, and one or more service centers 140 with network 150, ticket assignment system 110, one or more cloud datastores 120, one or more customer systems 130, and one or more service centers 140 may communicate directly with each other according to particular needs. In an embodiment, network 150 includes the Internet, telephone lines, any appropriate local area networks LANs, MANs, or WANs, and any other communication network coupling ticket assignment system 110, one or more cloud datastores 120, one or more customer systems 130, and one or more service centers 140. For example, data may be maintained by communication network 100 at one or more locations local to, or external of, ticket assignment system 110, one or more cloud datastores 120, one or more customer systems 130, or one or more service centers 140 and made available to ticket assignment system 110, one or more cloud datastores 120, one or more customer systems 130, and/or one or more service centers 140 using network 150 or in other appropriate manners. Those skilled in the art will recognize that the complete structure and operation of communication network 150 and other components within communication network 100 are not depicted or described. Embodiments may be employed in conjunction with other known communication networks and other components.

In one embodiment, ticket assignment system 110, one or more cloud datastores 120, one or more customer systems 130, and/or one or more service centers 140 may each operate on one or more computers or computer systems that are integral to, or separate from, the hardware and/or software that support communication network 100. In addition or as an alternative, one or more users may be associated with communication network 100 including ticket assignment system 110, one or more cloud datastores 120, one or more customer systems 130, and/or one or more service centers 140. These one or more users may include, for example, one or more computers programmed to autonomously monitor communication activity, ticket assignment, scoring, inferring missing data, and/or one or more related tasks within communication network 100. As used herein, the term "computer" or "computer system" includes any suitable input device, such as a keypad, mouse, touch screen, microphone, or other device to input information. Any suitable output device that may convey information associated with the operation of communication network 100, including digital or analog data, visual information, or audio information. Furthermore, the computer includes any suitable fixed or removable non-transitory computer-readable storage media, such as magnetic computer disks, CD-ROM, or other suitable media to receive output from and provide input to communication network 100. The computer also includes one or more processors and associated memory to execute instructions and manipulate information according to the operation of communication network 100.

In one embodiment and as discussed in more detail herein, ticket assignment system 110 of communication network 100 monitors and scores agents based on one or more agent ranking factors 242 to provide the agent scores, solution scores, agent skill scores, and customer satisfaction scores to one or more service centers 140. In addition, or as an alternative, ticket assignment system 110 stores and organizes agent scores, solution scores, agent skill scores, customer satisfaction scores based on agent ranking factors 242, such as, for example, an agent skill score associated with at least one of a plurality of topics, a customer satisfaction score associated with a closed ticket, a total time to resolve a closed ticket, whether the closed ticket was reopened prior to final resolution, and the like.

By way of example only and not by limitation, embodiments contemplate one or more service centers 140 comprising, for example, a call center or a retail service desk which sells, services, or otherwise provides subscription services to customers associated with one or more customer systems 130. Such subscription services may include, for example, a cloud-based email or voice-over-internet-protocol (VOIP) service. Although particular services are described as subscription services, embodiments contemplate other services or relationships between customers associated with one or more customer systems 130 and entities associated with one or more service centers 140.

Continuing with the above example, a customer associated with one or more customer systems 130 may initiate a communication to one or more service centers 140, which connects the customer's customer system communication device 134 with an agent associated with a service center communication devices 148 of one or more service centers 140. For example, the customer may call the one or more service centers 140 to inquire about a particular topic, such as, for example, a password reset of a web-based email program. When one or more service centers 140 receives the customer's communication, a communication network 100 identifies the communication channels 402a-402n (FIG. 4) as being a voice communication channels 402a-402n 402a initiated by the telephone call, categorizes the topic of the telephone call (in this example, as a password reset request) and generates agent scores 230 based on one or more agent ranking factors 242.

As described in further detail below, ticket assignment system 110 generates tickets based on a received communication from one or more customer systems 130. Tickets are assigned to agents of one or more service centers 140 based on the agent's skill in handling the customer issue identified in the ticket and the similarity between the customer and the agent. However, in some instances, ticket assignment system 110 cannot calculate the similarity between the customer and the agent because one or more records of data about the customer may be unknown or missing. According to one embodiment, ticket assignment system 110 infers missing data about the one or more customers based on known data about the one or more customers. Based on the inferred data, ticket assignment system 110 calculates the similarity between the agent and the customer.

Although one or more customer systems 130 are shown and described as comprising only a single associated customer, embodiments contemplate more than one customer associated with one (or more than one) of one or more customer systems 130. For example, the exemplary customer described above may correspond to any number of one or more individuals associated with one or more organizations contacting any number of one or more individuals of one or more service centers 140. Likewise, although only a single point of contact, i.e., an agent is described as being associated with one or more service centers 140, embodiments contemplate more than one point of contact, i.e., multiple agents at one or more service centers 140. For example, and as discussed above, when one or more service centers 140 provide subscription services to customers, the customers may speak with different agents of one or more service centers 140 to inquire about various subscription services, various issues, and at various times.

Figure 2:
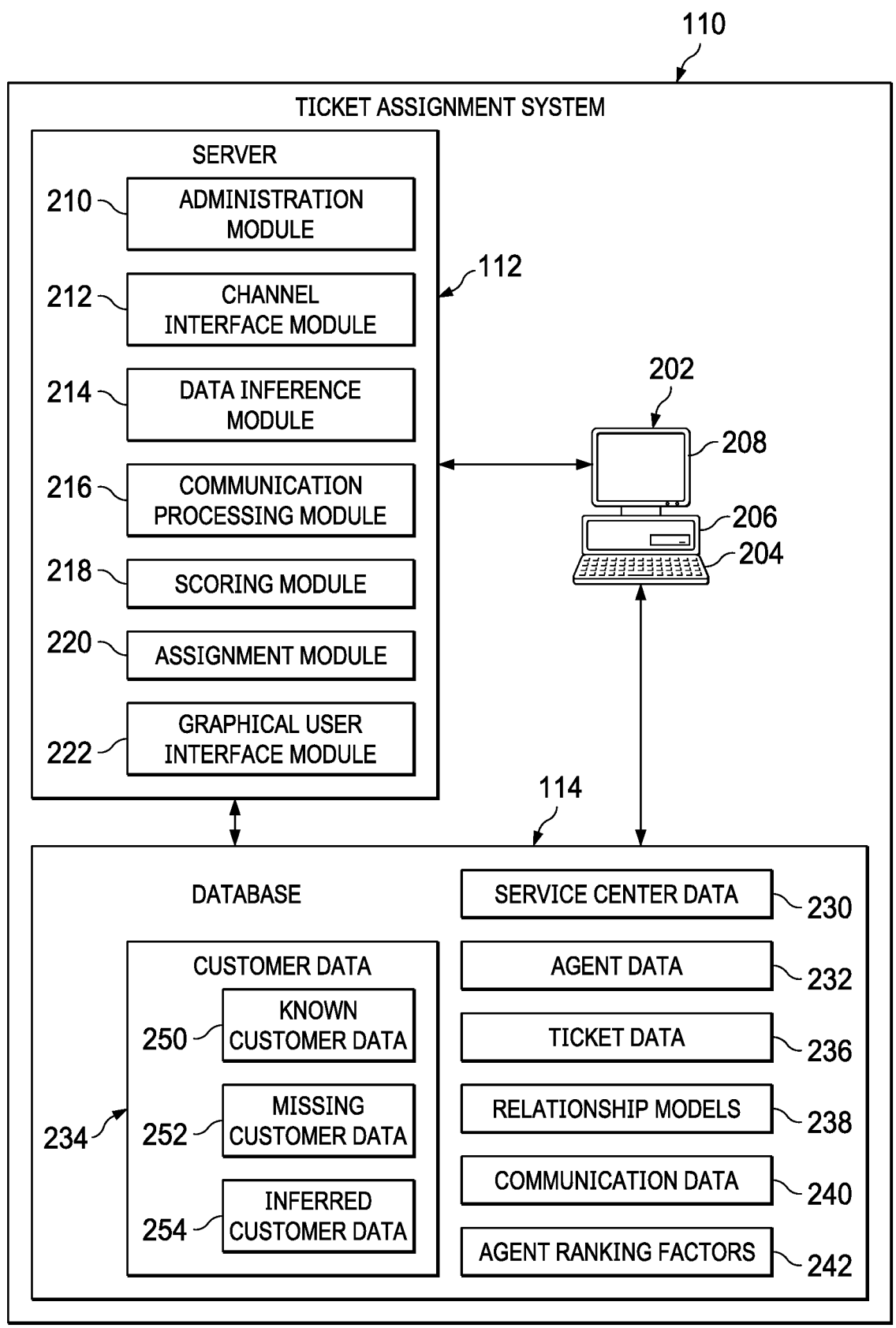
FIG. 2 illustrates the ticket assignment system of FIG. 1 in greater detail, according to an embodiment.

FIG. 2 illustrates ticket assignment system 110 of FIG. 1 in greater detail, according to an embodiment. As discussed herein, ticket assignment system 110 may comprise computer 202, server 112 and database 114. Although ticket assignment system 110 is shown and described as comprising a single computer 202, a single server 112, and a single database 114, embodiments contemplate any suitable number of computers, servers, or databases internal to, or externally coupled with, ticket assignment system 110, according to particular needs. In addition, or as an alternative, ticket assignment system 110 may be located internal to one or more service centers 140. In other embodiments, ticket assignment system 110 may be located external to one or more service centers 140 and may be located in, for example, a corporate or regional service center of one or more service centers 140, according to particular needs.

Computer 202 of ticket assignment system 110 may comprise one or more computers at one or more locations including associated input devices 204, output devices 206, non-transitory computer-readable storage media, processors 208, memory, or other components supporting ticket assignment system 110 and/or monitoring relationships and communication activity of one or more customer systems 130 and one or more service centers 140, in accordance with the operation of communication network 100.

Server 112 comprises administration module 210, channel interface module 212, data inference module 214, communication processing module 216, scoring module 218, assignment module 220, and graphical user interface module 222. Although a particular configuration of server 112 is shown and described, embodiments contemplate any suitable number or combination of modules, located at one or more locations, local to, or remote from, ticket assignment system 110, according to particular needs. In addition, or as an alternative, administration module 210, channel interface module 212, data inference module 214, communication processing module 216, scoring module 218, assignment module 220, and graphical user interface module 222 may be located on multiple servers or computers at one or more locations in communication network 100.

Database 114 comprises service center data 230, agent data 232, customer data 234, ticket data 236, relationship models 238, communication data 240, and agent ranking factors 242. Although, database 114 is shown and described as comprising service center data 230, agent data 232, customer data 234, ticket data 236, relationship models 238, communication data 240, and agent ranking factors 242, embodiments contemplate any suitable number or combination of these, located at one or more locations, local to, or remote from, ticket assignment system 110, according to particular needs.

Service center data 230 of database 114 comprises service center identification information such as, for example, names, addresses, company information, telephone numbers, email addresses, IP addresses, and the like of one or more service centers 140. In addition, service center data 230 may comprise configurations of communication network 100. In one embodiment, administration module 210 uses service center data 230 to identify one or more service centers 140 in communication network 100 and specifically configure communication network 100 for the identified one or more service centers 140. As an example only and not by way of limitation, administration module 210 uses service center data 230 to configure, for example, the processing and routing of incoming tickets, the routing of communications by channel interface module 212 over one or more communication channels 402a-402n; the selection of relationship models 238 used by data inference module 214 to generate inferred customer data 254; configuration of communication processing module 216 to interpret communication data 240 and the content of communications; the selection of scoring equations and agent ranking factors 242 used by scoring module 218 to calculate agent ranking scores; the selection of parameters (including, for example, a maximum wait time and a minimum agent score) used by assignment module 220 to assign tickets to one or more agents, and/or the configuration of graphical user interface module 222. By way of a more specific example and not of limitation, administration module 210 uses service center data 230 to configure graphical user interface module 222 to generate a particularized user interface specific to one or more entities (such as, for example, a business) whose customers are served by the one or more service centers 140. In addition, or as an alternative, graphical user interface module 222 generates a particularized user interface specific to one or more service centers 140 by, for example, generating a particularized user interface specific to the industry of an entity associated with one or more service centers 140, the types of customers served by one or more service centers 140, the types of products sold by, or an entity associated with, one or more service centers 140, and displaying notifications to service center communication devices 148 of one or more agents.

Agent data 232 comprises records about agents, which may include, for example, personal, identifying, communication, behavioral, and demographic records. Agent data 232 may include, for example, name, identification number, telephone number, IP number, social security number (SSN), age, gender, language, race, ethnicity, religion, location, highest education level, annual income, agent availability, whether an agent is currently connected to communication network 100, the types of communication channels 402a-402n over which agent may be reached, a current wait time to connect a customer communication with a particular agent, agent ranking factors 242, agent ranking scores, pleasantness scores, agent skill scores, and/or the like. Although, particular types of agent data 232 are described, embodiments contemplate utilizing one or more other types of agent data 232, according to particular needs.

Customer data 234 of database 114 comprises records about customers, including, for example, personal, identifying, communication, behavioral, and demographic records. According to one embodiment, customer data 234 may include, for example, name, identification number, SSN, reoccurring value, satisfaction level, age, gender, language, race, ethnicity, religion, location, highest education level, annual income, and/or the like. Although, particular types of customer data 222 are described, embodiments contemplate utilizing one or more other types of customer data 222, according to particular needs. According to a further embodiment, customer data 234 may be sorted according to known customer data 250, missing customer data 252, and inferred customer data 254. Known customer data 250 is customer data for which a value or range of values is known for one or more personal, identifying, communication, behavioral, and demographic records. Missing customer data 252 comprises records for which a value or range of values of one of the personal, identifying, communication, behavioral, and demographic records is unknown. Inferred customer data 254 are records for which a value or range of values of one of the personal, identifying, communication, behavioral, and demographic records has been calculated based, at least in part, on one or more relationship models 238. In one embodiment, inferred customer data 254 is based on known customer data 250, missing customer data 252, other inferred customer data 254, or a combination of the foregoing according to a relationship defined in one or more relationship models 238. According to other embodiments, inferred customer data 254 is calculated for missing customer data 252 according to one or more relationship models 238 and any known, missing, or inferred values or ranges of values of records of service center data 230, agent data 232, other customer data 234, ticket data 236, communication data 240, agent ranking factors 242, or one or more other data sources local to, or remote from, communication network 100. Embodiments contemplate data inference module 214 assigning a confidence score to records of known customer data 250, missing customer data 252, and inferred customer data 254, as discussed in further detail below.

Ticket data 236 of database 114 comprises data generated or received by one or more service centers 140 in connection with opening, resolving, and/or closing a ticket. A ticket of ticket assignment system 110 may be associated with an issue of a user of one or more customer systems 130 and one or more agents of one or more service centers 140. In one embodiment, ticket data 236 includes, but is not limited to: an issue, a subject, a topic, an identity of the user of one or more customer systems 130 which created the ticket, a customer service communication system 132a-132n or an entity associated with one or more customer systems 130 to which the ticket or ticket relates, one or more communication channels 402a-402n by which one or more customer systems 130 communicated with one or more service centers 140, a number of contacts between one or more customer systems 130 and one or more service centers 140 (historically or for a given time period), a total time spent on each of one or more communication channels 402a-402n, a cost associated with each communication activity, a time and a date of the ticket or ticket creation, and a log of the information shared during the communication activity between one or more customer systems 130 and one or more service centers 140. According to some embodiments and as described in more detail below, a subject of a ticket summarizes the issue described in the ticket, and a topic comprises one or more categories of the issues of the ticket. Embodiments contemplate the issues organized according to one or more subjects grouped into one or more topics in a single level of organization or in multiple hierarchical levels of organization, according to particular needs. In addition, or as an alternative, ticket data 236 additionally comprises purchases, sales, subscriptions, purchase history, sales history, and/or other historical data describing the relationship of one or more customer systems 130 to one or more service centers 140. In this way, ticket data 236 provides one or more service centers 140 with historical information which provides greater insight by placing current tickets into a historical context describing one or more customers (including, for example, a priority of the one or more customers), one or more agents, and the nature of previous communications or other interactions.

According to one embodiment, relationship models 238 of database 114 comprise associations between known customer data 250 and missing customer data 252 which are used to generate inferred customer data 254. In other embodiments, relationship models 238 define a process or formula which data inference module 214 uses to calculate inferred customer data 254 from any known, missing, or inferred values or ranges of values of records of service center data 230, agent data 232, other customer data 234, ticket data 236, communication data 240, agent ranking factors 242, or one or more other data sources local to, or remote from, communication network 100. Embodiments contemplate relationship models 238 defining a process or formula which data inference module 214 uses to determine a confidence score for any known or inferred records of service center data 230, agent data 232, other customer data 234, ticket data 236, communication data 240, agent ranking factors 242, or one or more other data sources local to, or remote from, communication network 100.

According to one embodiment, relationship models 238 comprise a lookup table wherein missing customer data 252 is checked against known customer data 250 to check if one or more of relationship models 238 define a relationship between known customer data 250 and missing customer data 252. By way of example only and not by way of limitation, data inference module 214 uses one or more relationship models 238 to calculate inferred customer data 254 based on known customer data 250, according to TABLE 1:

TABLE 1

| Known Customer Data 250 (Value or Range of Values) | Missing Customer Data 252 (Measure) | Inferred Customer Data 254 (Value or Range of Values) |
|---|---|---|
| SSN | Age | Age Group (E.g. 0-25 years old, 26-34 years old, 35-49 years old, 50-65 years old, and 65+ years old) |
| Birth Year | Age | Age Value |
| First Name | Gender | Male; Female |
| Communication data 240 | Language | English, Spanish; French; Etc. |
| Communication data 240 | Highest Education Level | Highest Level of Education Group (E.g. less than high school; high school; associate degree, bachelor's degree, master's degree, and PhD or other advanced degree) |
| Communication data 240 | Reading Level | Reading Level Group (E.g. grade school; high school; college or greater) |
| School or Degree | Highest Level of Education | Highest Level of Education Group (E.g. less than high school; high school; associate degree, bachelor's degree, master's degree, and PhD or other advanced degree) |
| First and Last Name | Ethnic or Cultural Identity | Ethnic or Cultural Identity Value |
| Language | Ethnic or Cultural Identity | Ethnic or Cultural Identity Value |
| Zip Code or Address | Location | City Value; State Value; Country Value; Region Value; Etc. |
| Communication channels 402a-402n | Generation | Generation Group (E.g. Generation Z; Generation Y; Generation X; Baby Boomers; Silent Generation; and Greatest Generation) |

TABLE 1 illustrates exemplary relationships between exemplary known customer data 250, missing customer data 252, and inferred customer data 254, according to one embodiment. According to this exemplary embodiment, relationship models 238 define relationships among values or ranges of values of known customer data 250 (such as, for example, values or ranges of values for SSN, birth year, first name, last name, full name, communication data 240, school or degree, language, zip code or address (or other location information), and communication channels 402a-402n; a measure of missing customer data 252 (such as, for example, age, gender, language, highest education level, reading level, ethnic or cultural identity, location, and generation); and values or ranges of values of inferred customer data 254 (such as, for example, age group (e.g. 0-25 years old, 26-34 years old, 35-49 years old, 50-65 years old, and 65+ years old), age value (18 years old, 19 years old, 20 years old, etc.), male, female, English, Spanish, French, etc., highest level of education group (e.g. less than high school, high school, associate degree, bachelor's degree, master's degree, and PhD or other advanced degree), reading level group (e.g. grade school, high school, college or greater), highest level of education group (e.g. less than high school, high school, associate degree, bachelor's degree, master's degree, and PhD or other advanced degree), ethnic or cultural identity value, city value, state value, country value, region value, and generation group (E.g. Generation Z, Generation Y, Generation X, Baby Boomers, Silent Generation, and Greatest Generation).

By way of further explanation only and not of limitation, an example is now given where missing customer data 252 comprises age and known customer data 250 comprises SSN or birth year. Continuing with this example, data inference module 214 checks database 114 for one or more relationship models 238 associating age with SSN or birth year. In response to identifying one or more relationship models 238 defining a relationship between SSN and a range of age values, data inference module 214 creates an age record for a customer having the range of values (and/or a group defined by the range of values) based on the customer's known SSN. (If, for example, SSNs beginning with one were issued to years 1920-1925, SSNs beginning with two were issued to years 1926-1931, SSNs beginning with three were issued to years 1932-1945, data inference module 214 assigns to a customer having a SSN beginning with two an age range of 1926-1931. Similarly, relationship models 238 may indicate that when the birth year is known, age may be calculated by subtracting the birth year from the current year. According to some embodiments of relationship models 238, data inference module 214 may utilize relationship models 238 in a forward direction or a backward direction. Continuing with the previous example, if, for example, known customer data 250 comprises age and missing data 252 comprises birth year or SSN, data inference module 214 may infer birth year and SSN use the exemplary relationship models 238 in a reverse direction. For example, when age is 86, data inference module 214 may infer that birth year is 1933 and SSN begins with three. Embodiments contemplate a parameter associated with one or more relationship models 238 identifying whether the one or more relationship models 238 define a relationship that is true in only one direction or whether the relationship is true in a forward and a reverse direction. Although particular values, ranges of values, measures, and relationships among known customer data 250, missing customer data 252, and inferred customer data 254 are shown and described herein, embodiments contemplate relationship models 238 defining any relationship among any known, missing, or inferred values, ranges of values, or measures of records of service center data 230, agent data 232, other customer data 234, ticket data 236, communication data 240, agent ranking factors 242, or one or more other data sources local to, or remote from, communication network 100, according to particular needs. In addition, embodiments contemplate relationship models 238 comprising one or more machine learning or other artificial intelligence methods used by data inference module 214 to train relationship models 238, as described in more detail below.

By way of further explanation only and not of limitation, a second and more specific example is given in connection with relationship models 238 defining values for inferred customer data 252 according to TABLE 2:

TABLE 2

| Missing Customer Data 252 | Known customer data 250 | | Inferred Customer Data 252 | |
| --- | --- | --- | --- | --- |
| Measure | Measure | Value | Measure | Value |
| Gender | First Name | List of Male Names (e.g. Michael, Stuart, Jonathan, etc.) | Gender | MALE when first name = name on list of known male names |
| | | List of Female Names (Abigail, Bridget, Cynthia, etc.) | Gender | FEMALE when first name = name on list of known female names |
| | | | Gender | UNKNOWN when first name is not on list of known male names and not on list of known female names |

TABLE 2 illustrates a relationship between known customer data 250 comprising a first name and inferred customer data 252 comprising a customer's gender. According to this embodiment, when known customer data 250 comprises a first name and missing customer data 252 comprises gender, relationships models 238 instruct data inference module 214 to check a list of male names and a list of female names. When the first name of a customer is identified on the list of known male names, data inference module 214 assigns a gender of male to the customer. When the first name of a customer is identified on the list of known female names, data inference module 214 assigns a gender of female to the customer. When the first name of a customer is not identified on the list of known male names and the list of known female names, data inference module 214 may assign a value of unknown to the customer or assign no value to the customer.

By way of a further example only and not by way of limitation, data inference module 214 assigns a value or range of values according to TABLE 3:

TABLE 3

| Missing Customer Data 252 | Known customer data 250 | | Inferred Customer Data 252 | |
|---|---|---|---|---|
| Measure | Measure | Value | Measure | Value |
| Reading Level | Reading Level Score (from Communication data 240) | 90-100+ | Reading Level | Grade School = greater than 70 |
| | | 80-90 | Reading Level | |
| | | 70-80 | Reading Level | |
| | | 60-70 | Reading Level | High School = between 30 and 70 |
| | | 50-60 | Reading Level | |
| | | 40-50 | Reading Level | |
| | | 30-40 | Reading Level | |
| | | 20-30 | Reading Level | Some College and above = less than 30 |
| | | 10-20 | Reading Level | |
| | | <10 | Reading Level | |

TABLE 3 illustrates the assignment of a reading level based on processing communication data 240 to determine a reading level score from the content of the communication. According to embodiments, relationship models 238 define a relationship between a calculated reading level score and a customer reading level. According to one embodiment, reading level score is calculated by an equation generating a score based on average word length and average sentence length of a customer communication. Relationship models 238 assign a reading level based on the calculated reading level score, as indicated above in TABLE 3. For example, when the reading level score of a customer communication is greater than seventy, data inference module 214 assigns a grade school reading level to the customer. When a customer's reading level score is between 30 and 70, data inference module 214 assigns a high school reading level to the customer; and, when a customer's reading level score is less than 30, data inference module 214 assigns the customer a college reading level. Although customer reading level is shown and described as comprising a particular value based on a particular scoring equation, embodiments contemplate customer reading level based on any suitable data, including, for example, assigning reading level score based on using natural language processing of communication data 240 by communication processing module 216, as described below.

Communication data 240 of database 114 comprises the communication activity of one or more customer systems 130 and one or more service centers 140. According to some embodiments, channel interface module 212 records communication activity sent to, or received from, customer system communication devices 134 and service center communication devices 148, and organization and setup of channel interface module 212. In addition, or as an alternative, communication data 240 comprises records describing communication activity or data collected in connection with one or more users or devices associated with the communication activity, such as, for example, identification of particular communication channels 402a-402n which are open to a particular customer or service center, times which the communication channels 402a-402n are open, the time of a particular communication, the customer or agent that initiated the communication, the communication channels 402a-402n used for the communication, a total time to resolve a closed ticket, protocols or metadata which describe a communication, setup or configuration parameters of channel interface module 212, and the like. In addition, communication data 240 comprises communication content, which, as described in more detail below, may comprise textual content (including, for example, a transcript), visual content, audio content, or metadata of any one or more communications.

In addition, communication data 240 is used by data inference module 214 and one or more relationship models 238 to calculate inferred customer data 252. In one example, one or more relationship models 238 define a relationship between known values of communication data 240 and values of inferred customer data 242 based, at least in part, on a calculated inferred customer data score. In one embodiment, data inference module 214 calculates inferred customer data 252 from communication data 240 when missing data 252 comprises generation, according to TABLE 4:

TABLE 4

| Missing Customer Data 252 | Communication data 240 | | Inferred Customer Data 252 | |
|---|---|---|---|---|
| Measure | Measure | Value | Score | Value |
| Generation | Communication Channels (402a-402n) | Video; Chat; Text Email; Voice | 0 | Z when score = 0-0.1 |
| | | | 1 | |
| | | Other | 0.5 | Y when score = 0.1-0.3 |
| | Communication contains Emojis | Yes | 0 | |
| | | No | 1 | X when score = 0.3-0.6 |
| | Natural Language Processing for Generation Analysis (from content of communication) | High Confidence of Younger Generation | 0 | |
| | | Medium Confidence of Younger Generation | 0.2 | BB when score = 0.6-0.8 |
| | | Low Confidence of Younger Generation | 0.4 | |
| | | High Confidence of Older Generation | 1 | SG when score = 0.8-0.9 |

TABLE 4-continued

| Missing Customer Data 252 | Communication data 240 | | Inferred Customer Data 252 | |
|---|---|---|---|---|
| Measure | Measure | Value | Score | Value |
| | | Medium Confidence of Older Generation | 0.8 | GG when score = 0.9-1.0 |
| | | Low Confidence of Older Generation | 0.6 | |

TABLE 4 illustrates the assignment of a generation group based on the consideration of three measures of communication data 240: communication channels 402a-402n; a determination whether the communication contains emojis, and natural language processing. In this example, data inference module 214 calculates an inferred customer data score by assigning a value between zero and one, where zero indicates a younger generation and one indicates an older generation, to values or ranges of values of known communication data 240. Based, at least in part, on the calculated inferred customer data score, data inference module 214 assigns generational names wherein: Generation Z=inferred customer data score of 0-0.1; Generation Y=inferred customer data score of 0.1-0.3; Generation X=inferred customer data score of 0.3-0.6; Baby Boomers (BB)=inferred customer data score of 0.6-0.8; Silent Generation (SG)= inferred customer data score of 0.8-0.9; and Greatest Generation (GG)=inferred customer data score of 0.9-1.0. Although the example shown and described in connection with TABLE 4 calculates an inferred customer data score based on communication data 240, embodiments contemplate inferred customer data scores calculated by scoring any known, missing, or inferred values, ranges of values, or measures of records of service center data 230, agent data 232, other customer data 234, ticket data 236, communication data 240, agent ranking factors 242, or one or more other data sources local to, or remote from, communication network 100, according to particular needs.

Agent ranking factors 242 of database 114 comprise one or more factors used by ticket assignment system 110 to match customers of one or more customer systems 130 with agents of one or more service centers 140. According to one embodiment, agent ranking factors 242 comprise demographic information which is matched between the customer and the agent including, for example, age, race, religion, gender, highest level of education, annual income. In addition, agent ranking factors 242 comprise evaluations or scores of the agent including, for example, a pleasantness score, a tone of voice evaluation, a customer engagement score, a ticket completion speed, customer satisfaction score, a percentage of re-opened tickets, topic knowledge, an agent skill score, topic-handling speed, and the like. According to one embodiment, a re-opened ticket may comprise a ticket that was tagged as resolved or closed by administration module 210 but which receives a subsequent communication that is assigned to the same ticket.

However, as described in more detail below, when channel interface module 212 receives a communication associated with a closed ticket (and/or a customer of a closed ticket) communication processing module 216 determines a triviality score for the communication. When the communication processing module 216 determines the communication is trivial, an agent associated with the closed ticket (and/or a customer of a closed ticket) is not penalized based on the trivial communication. For example, when a communication from one or more customer systems 130 is associated with a closed ticket and the communication is acknowledging receipt of a communication or confirming resolution of the problem of a closed ticket, ticket assignment system 110 may re-open the ticket and not assess a penalty to the agent based on the re-opened ticket. In the alternative, ticket assignment system 110 does not reopen the ticket and does not assess a penalty to the agent for a trivial communication associated with the closed ticket.

Administration module 210 of server 112 may configure, update, and/or manage the operation of communication network 100 including processing and routing of one or more tickets. As described above, administration module 210 configures communication network 100 including, for example, configuring the storage and management of data for ticket assignment system 110, one or more cloud datastores 120, one or more customer systems 130, and/or one or more service centers 140, according to particular needs. In one embodiment, administration module 210 creates, receives, processes, updates, and stores tickets associated with one or customer issues. As described in more detail below, administration module 210 receives (and/or creates) incoming tickets, evaluates tickets for customer data 234, checks whether customer data 234 comprises missing customer data 252, matches tickets to agents based on an agent score, closes or opens tickets, and checks availability and wait time of one or more agents.

Channel interface module 212 of server 112 monitors communication activity of one or more customer systems 130 and one or more service centers 140. For example, channel interface module 212 may comprise one or more communication channels 402a-402n for receiving and transmitting communications of customer system communication systems 132a-132n and service center communication systems 146. For example, channel interface module 212 may initiate communications to customer system communication devices 134 and/or service center communication devices 148 and/or receive communications from customer system communication devices 134 and/or service center communication devices 148. According to some embodiments, channel interface module 212 monitors and records the time, duration, date, voice, text, and other like communication data 240 of one or more communication activities.

Data inference module 214 of server 112 generates inferred customer data 254 based, at least in part, on a relationship defined in one or more relationship models 238. For example, when one or more relationship models 238 define a relationship between values or ranges of values of known customer data 250 and missing customer data 252, data inference module 214 generates inferred customer data 254 based on known customer data 250, missing customer data 252, and the one or more relationship models 238. In addition and as described above, data inference module 214 may calculate inferred customer data 254 based on an inferred customer data score calculated from points assigned to particular values or ranges of values of service center data 230, agent data 232, other customer data 234, ticket data 236, relationship models 238, communication data 240, and/or agent ranking factors 242.

In one embodiment, data inference module 214 comprises a machine learning training module and/or a machine learning prediction module that trains a machine learning model using known customer data 250 and predicts inferred customer data 254 for missing customer data 252. In another embodiment, ticket assignment system 110 comprises an unsupervised deep learning model that uses a training set comprising any one or more relationship models 238 and any known, unknown, or inferred records of service center data 230, agent data 232, other customer data 234, ticket data 236, communication data 240, agent ranking factors 242, or one or more other data sources local to, or remote from, communication network 100 to predict any other known, unknown, or inferred records of service center data 230, agent data 232, other customer data 234, ticket data 236, communication data 240, agent ranking factors 242, or one or more other data sources local to, or remote from, communication network 100. By way of example only and not by way of limitation, data inference module 214 may use machine learning to update list of male first names and list of female first names based on the relationship between first names and gender identified in customer data 234. By way of a further example, data inference module 214 may use machine learning to create a machine learning model that identifies gender (or any other missing customer data 252) using list of male names, list of female names, and any other known, unknown, or inferred records of service center data 230, agent data 232, other customer data 234, ticket data 236, communication data 240, agent ranking factors 242, or one or more other data sources local to, or remote from, communication network 100. Continuing with this example, when data inference module 214 does not locate a first name on the list of male names and the list of female names but does locate other customers with the same or a similar first name, data inference module 214 may generate one or more relationship models 238 that identify a relationship between the first name and gender based on the relationship identified between first name and gender for other customers with the same or a similar name.

According to one embodiment, communication processing module 216 of server 112 analyzes one or more communications to identify inferred customer data 252 as described above. According to one embodiment, communication processing module 216 searches communication content for particular words, phrases, text, or emoji that are associated with a particular generation, education, socioeconomic group, cultural identity, or the like. In addition, communication content as described in more detail below, may comprise textual content (including, for example, a transcript), visual content, audio content, or metadata of any one or more communications. In addition, communication content may comprise the natural language processing or a particular scoring equation used to assign a value to the communication content, such as, for example, a highest education level, a reading level, a language, a gender, an age, a generation, or the like. In addition, the communication content may be scanned for particular content such as, for example, emojis, slang, and the like, which may be associated using one or more relationship models 238 with a particular score or a particular value of one or more measures, such as, for example, a highest education level, a reading level, a language, a gender, an age, a generation, or the like.

In addition, communication processing module 216 analyzes communications to identify a topic of the communication. As discussed herein, agent scores are topic-specific. For example, a first agent may have a high skill score a first one or more topics (such as, for example, password-resets and customer not receiving email), while having a low skill score for a second one or more topics (such as, for example, poor internet connectivity, replacing broken hardware, and upgrading firmware of communication devices). However, a second agent may have a high skill score for one or more of the second one or more topics (such as, for example, poor internet connectivity and upgrading firmware of communication devices) and a low skill score for one or more of the first one or more topics (such as, for example, password-resets, not receiving email). By assigning topic-specific agent scores, a ticket identifying a customer issue may be assigned to an agent that may resolve the customer issue with greater efficiency and/or customer satisfaction. As described in more detail below, the agent score may be calculated by scoring module 218 based on the topic of tickets handled by the agent and determined by communication processing module 216 from analyzing the ticket and/or one or more communications associated with the ticket. In one embodiment, communication processing module 216 comprises a natural language processing method that scores the similarity between text of the topic and/or the subject assigned to a ticket and the text associated with known topics and/or subjects, such as, for example, other tickets, knowledge resources, and the like. According to a particular embodiment, scoring module 218 uses a TextRank method to identify keywords and/or phrases from the customer ticket. By way of example only and not by way of limitation, scoring module 218 calculates the distance metric between the subject and/or topic of a customer ticket and ticket data 236 by assigning weighted points to a matched subject of the customer ticket and ticket data 236 and/or a matched topic of the customer ticket and ticket data 236.

As stated above, communication processing module 216 may perform a triviality analysis on a communication assigned to a closed ticket to determine whether the ticket should be reopened. For example, when a communication is received and assigned to a closed ticket or a customer associated with a closed ticket and related to the same problem as the closed ticket, communication processing module 216 identifies whether the communication is trivial and should not reopen the ticket. Additionally, or in the alternative, the ticket is reopened, but no penalty is assessed to the agent associated with the closed ticket.

According to an embodiment, scoring module 218 calculates an agent score for a ticket by awarding a particular number of points for agent ranking factors 242. According to one embodiment, agent ranking factors 242 comprise matches between the value of one or more records of agent data 232 and one or more records of customer data 234 for the customer associated with the ticket. For example, age may be organized into one or more groups such as, for example, 0-25 years old, 26-34 years old, 35-49 years old, 50-65 years old, and 65+ years old; highest level of education may be organized into groups such as, for example, less than high school; high school; associate degree, bachelor's degree, master's degree, and PhD or other advanced degree. When the group assigned to an agent matches the group assigned to a customer associated with the ticket, scoring module 218 adds points to the agent score. Because race, religion, and gender comprise discrete values, instead of groups, scoring module 218 adds points to the agent score when the value for a customer exactly or nearly exactly matches the value for the agent. For other agent ranking factors 242, scoring module 218 may award points based on the calculated score for the agent. For example, scoring modules 218 may calculate a pleasantness score, a tone of voice score, and a customer engagement score as a value between 0 and 100. In one embodiment, scoring module 218 awards points according to the following: score of 0–10=1 point, 11–20=2 points, 21–40=4 points, 41–80=10 points, and 81–100=20 points. Ticket completion speed may comprise a percentage of tickets that are completed within a predetermined time period. Percentage of reopened customer tickets may comprise a percentage of customer tickets that are not reopened with a predetermined number of days.

Because some of agent ranking factors 242 may be more important than others, when calculating the agent score, weights may be added to each of the agent ranking factors 242 which increase or decrease the importance of the points associated with the agent ranking factors to the overall sum of all points of agent ranking factors 242. In addition, scoring module 218 may adjust points and/or weights over time based on the accuracy of the outcomes. For example, when scoring module 218 matches customers with one or more agents of one or service centers 140 based on points and/or weights, as described above, scoring module 218 may monitor the accuracy of the matches, and, when the outcome for those matches do not improve over time, scoring module 218 adjusts points and/or weights to improve the matches predicted by the calculations, as described below.

For example, the agent score may comprise the following weights and points associated with the following exemplary agent ranking factors 242 of TABLE 5:

TABLE 5

| Agent ranking factor | How Points are Assigned | Points | Weight |
|---|---|---|---|
| Age (Groups: 0-25 years old, 26-34 years old, 35-49 years old, 50-65 years old, and 65+ years old) | Match Group | 15 points | 0.75 |
| Gender | Match Value | 20 points | 1.25 |
| Highest Level of Education (Groups: less than high school; high school; associate degree, bachelor's degree, master's degree, and PhD or other advanced degree) | Match Group | 5 | 0.75 |
| Pleasantness Score Tone of Voice Score | Based on Score | 0-10 = 1 point 11-20 = 2 points 21-40 = 4 points 41-80 = 10 points 81-100 = 20 points | 1.00 |
| Ticket Completion Speed (Percentage of tickets completed within predetermined time) | | 0-10 = 0 point 11-20 = 1 points 21-40 = 2 points 41-80 = 5 points 81-100 = 10 points | 1.00 |
| Percentage of Reopened Customer Tickets | | 0-10 = 20 point 11-20 = 10 points 21-40 = 5 points 41-80 = 4 points 81-100 = 0 points | 1.00 |

Example 1: In this example, the agent score for an exemplary agent (Agent A) who is 25 years old, male, has an associate degree, and a pleasantness score of 50, tone of voice score 75, ticket completion speed of 85%, percentage of reopened tickets of 6% and Customer A who is 45 years old, female, and has an associate degree would be 0(0.75)+0(1.25)+5(0.75)+10(1.00)+10(1.00)+10(1.00)+20(1.00)= 53.75.

Example 2: The agent score for Agent A and Customer B who is 22 years old, male, and has a high school degree would be: 15(0.75)+20(1.25)+0(0.75)+10(1.00)+10(1.00)+10(1.00)+20(1.00)=86.25. In addition, and as described above, scoring module 218 may check whether Agent A and Customer B are a good match and increase or decrease the points and/or weights so that the outcome of the calculation is a better match, as discussed above.

As described in more detail below, scoring module 218 calculates a customer satisfaction score for an agent by assigning points and/or weights to particular data associated with the satisfaction of customers associated with tickets closed by the agent including, for example, receiving a positive survey response by a customer of one or more customer systems 130 in response to handling or solving a ticket, no new tickets within a particular time period from the same customer associated with the closed ticket, and/or one or more additional factors described herein. Survey responses indicate the positive and/or negative customer satisfaction score of a customer of one or more customer systems 130 based on completed surveys. For example, in some embodiments, when one or more service centers 140 indicates that a status of a ticket is resolved or closed, ticket assignment system 110 sends a survey to one or more customer systems 130. In addition, or as an alternative, ticket assignment system 110 may send surveys to one or more customer systems 130 at the discretion of one or more service centers 140 and not based on a particular status of a ticket. The results of the survey are calculated by scoring module 218, and the results are stored as customer data 222 and/or agent ranking factors 242, and may include a list of all or a selection of the most recent survey responses for the one or more customer systems 130, a ticket number associated with the survey response, the agent of one or more service centers 140 that handled the ticket associated with the survey response, and a customer satisfaction score indication whether a customer of one or more customer systems 130 indicated on the survey that the resolution of the ticket was positive or negative.

In an embodiment and in order to indicate the operation of surveys within ticket assignment system 110, TABLE 6 provides the following particular examples.

TABLE 6

| Survey | Name | Scheduled and Survey Rules | Customer Satisfaction Score Points for Negative Response | Customer Satisfaction Score Points for Positive Response |
|---|---|---|---|---|
| After Contact Survey | Survey 1 | Send 24 hours after ticket closed | −15 | +15 |
| Regular Survey | Survey 2 | Send every 12 month to every customer | −20 | +20 |

Assume in the following examples that a customer of one or more customer systems 130 starts with a customer satisfaction score of 100 points, where 100-75 indicates a positive customer satisfaction score, 74-31 indicates a neutral customer satisfaction score, and 30-0 indicates a negative customer satisfaction score, the points awarded for a positive and negative survey are according to TABLE 6, and the points subtracted for having a new ticket within a particular time period from the same customer associated with the closed ticket is 20 points for less than 30 days and 15 points for more than 30 days but less than 60 days. Although particular ranges of points are described as associated with a positive customer satisfaction score, a neutral customer satisfaction score, and a negative customer satisfaction score, the ranges and the level of satisfaction assigned to each range are adjustable by customer representatives of one or more service centers 140, as described in more detail below. In addition, although the customer satisfaction score is described in connection with a level of customer satisfaction (positive, neutral, and negative), embodiments contemplate associating other characteristics with the customer satisfaction score, such as, for example, a level of happiness (happy, neutral, unhappy), and the like.

Example 3: On Jan. 1, 2017, one or more customer systems 130 represented by Customer A calls an agent of one or more service centers 140 to set up a new service. One or more service centers 140 represented by Agent A opens a new ticket and assigns the topic relating to setting up a new service. Customer A wishes to set up a product, so Agent A assigns a second topic associated with setting up a new product. After helping Customer A set up the new service and the new product, an after contact survey is sent to Customer A who gives a negative response. Therefore, Customer A would have 15 points subtracted from the customer satisfaction score, giving a customer satisfaction score for Customer A of 85 points, which indicates a happy customer satisfaction score.

Example 4: The same Customer A from Example 1 calls Agent A on Feb. 1, 2017. Customer A is experiencing a problem with the product that was set up in Example 1. Because Customer A currently has a satisfaction score of 85 points and the problem is related to the same ticket and happened after 30 days but less than 60 days, 15 points are subtracted from the customer satisfaction score of Customer A, which is now 70 points. After helping Customer A resolve the problem with the product, an after contact survey is sent to Customer A who gives a negative response. Therefore, Customer A would have 15 points subtracted from the customer satisfaction score (currently 70 points) giving a customer satisfaction score for Customer A of 55 points, which indicates a neutral customer satisfaction score.

By way of explanation and not of limitation and as stated above, Agent A representing one or more customer representatives of one or more service centers 140 adjusts ranges associated with each of the levels of satisfaction (positive, neutral, negative) of Customer A. Continuing with the non-limiting example, although 100-75 is described as comprising a positive customer satisfaction score, 74-31 is described as comprising a neutral customer satisfaction score, and 30-0 is described as comprising a negative customer satisfaction score, Agent A adjusts ranges so that a positive customer satisfaction score comprises a range of 100-91 points, a neutral customer satisfaction score comprises 90-81 points, and a negative customer satisfactions core comprises a range of 80-0 points. After adjustment of the ranges associated with the customer satisfaction score, the calculation described above giving Customer A customer satisfaction score of 55 points would indicate a negative customer satisfaction.

Additionally and also as described in more detail below, scoring module 218 calculates an agent skill score by assigning points and/or weights to particular data associated with the skill of the agent of one or more service centers 140 in handling tickets associated with a particular topic including, for example, a number of tickets worked by the agent for the topic, an average time to resolve tickets for the topic, a customer satisfaction score for the topic, a manual adjustment by a supervisor of the agent, and/or one or more additional factors described herein.

For example, the agent skill score may comprise the following weights and points as illustrated in TABLE 7.

TABLE 7

| Agent Skill | How Points are Assigned | Points | Weight |
|---|---|---|---|
| Number of Tickets for the Topic | Number of Tickets | 0-10 = 1 point<br>11-20 = 2 points<br>21-40 = 4 points<br>41-80 = 10 points<br>81-100 = 20 points | 0.5 |
| Average Time to Resolve Tickets for the Topic | Percentile Compared with Average of Other Agents | 0-10 = 1 point<br>11-20 = 2 points<br>21-40 = 4 points<br>41-80 = 10 points<br>81-100 = 20 points | 0.75 |
| Customer Satisfaction Scores for Topic | Average Customer Satisfaction Score for Topic | 0-30 = 0 points<br>31-74 = 10 points<br>75-100 = 20 points | 0.75 |
| Manual Adjustment by Supervisor of Agent | | Any number of points that may be manually selected. | 1.00 |

Example 5: For a particular topic, Agent A has handled 40 tickets, falls within the 60th percentile of average time to resolve tickets when compared with all other agents who have handled tickets for the particular topic, has an average customer satisfaction score this topic of 80, and has received no manual adjustment of the score by the supervisor. To calculate an agent skill score for Agent A comprises: 4(0.5)+10(0.75)+20(0.75)+0(1.00)=24.5.

Example 6: A second agent, Agent B, has handled 90 tickets, has an average time to resolve tickets that falls within the 95th percentile, has an average customer satisfaction score for of 40, and has received a manual adjustment by a supervisor of 30 points. To calculate an agent skill score for Agent B comprises: 20(0.5)+20(0.75)+10(0.75)+30(1.00)=61.5.

According to embodiments, assignment module 220 matches customers of one or more customer systems 130 with agents of one or service centers 140 based, at least in part, by calculating an agent score based on points and/or weights associated with one or more agent ranking factors 242. Agents are ranked on a per topic basis. Some topics are so easy that all agents are roughly equal, so then the scoring system may move to a second system where they check for the best agent for a particular customer.

Graphical user interface module 222 of server 112 generates a graphical user interface comprising graphics, text, and interactive elements providing for display, configuration, editing, selection, receipt, and transmission of: one or more closed tickets, hierarchies of topics and subjects identified from tickets, etc.); data analytics (charts, graphs, metrics, infographics, etc.); parameters for the collection, retrieval, analysis, and storage of service center data 230, customer data 222, communication data 240, ticket data 236, agent ranking factors 242, knowledge resource data 230, and knowledge resource ranking factors 232; and user or system notifications, including, for example, recommendations for resolving one or more customer issues described in a ticket, closing the ticket, and contacting the agent who created the recommendation. In addition, or as an alternative, the agent recommendation may be displayed to the agent each time a user of the one or more customer systems 130 initiates communication activity, during or in connection with a responsive communication, and/or for the duration of a communication or the preparation of a communication.

One or more service centers 140 uses graphical user interface module 222 to create, modify, and manage agent data 232, customer data 234, ticket data 236, relationship models 238, communication data 240, and agent ranking factors 242. According to one embodiment, graphical user interface module 222 provides for creating, modifying, and managing scores, penalties, and values associated with agent ranking factors 242. As an example only and not by way of limitation, graphical user interface module 222 provides one or more service centers 140 with options to generate new topics, reorganize the hierarchy of topics, assign scores, penalties, and values to one or more topics and subjects, and associate agents with tickets for one or more customers, as explained below.

In one embodiment, ticket assignment system 110 comprises a centralized computer system which operates system-level architecture of communication network 100. In this manner, ticket assignment system 110, through one or more modules, provides a communication network 100 for use by agents of one or more service centers 140 and which provides for efficiently assigning and resolving tickets from a single and/or central location while maintaining a high level of customer satisfaction.

Figure 3:
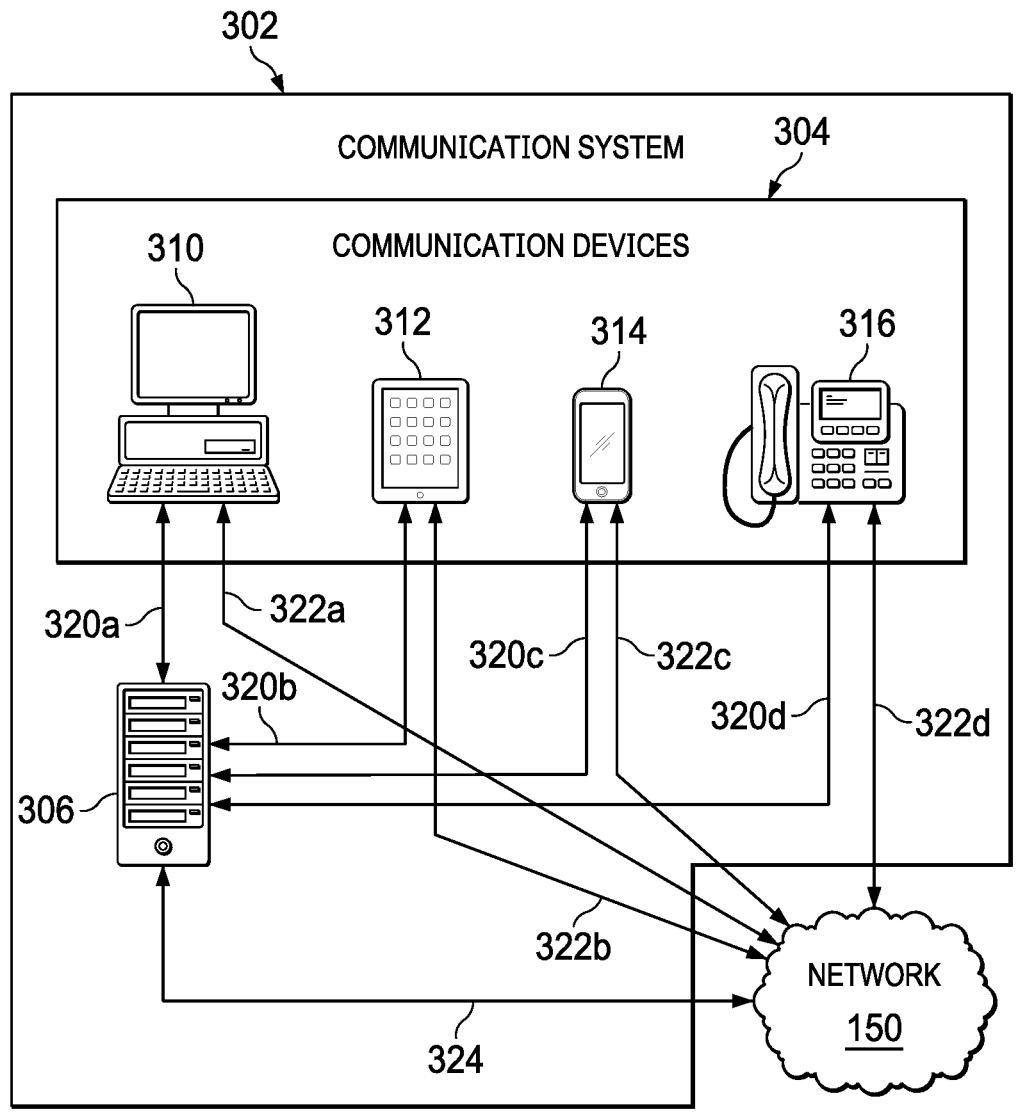
FIG. 3 illustrates an exemplary communication system in greater detail, according to an embodiment.

FIG. 3 illustrates exemplary communication system 302, according to an embodiment. Exemplary communication system 302 represents customer service communication systems 132*a*-132*n* of one or more customer systems 130 and/or service center communication systems 146 of one or more service centers 140. Exemplary communication system 302 may comprise communication devices 304, server 306, and/or communication links 320*a*-320*d*, 322*a*-322*d*, and 324 which may be configured to communicate with network 150, ticket assignment system 110, one or more cloud datastores 120, customer service communication systems 132*a*-132*n* of one or more customer systems 130 and service center communication system 146 of one or more service centers 140. In one embodiment, exemplary communication system 302 may comprise computer system 310, which operates on one or more shared or separate computer systems. Computer system 310 may comprise one or more of as a work station, personal computer, network computer, laptop computer, or notebook computer. In addition, exemplary communication devices 304 may comprise one or more other communication devices 304 such as, for example, a tablet-type device 312, smartphone 314, a terminal, or other suitable communication device. According to some embodiments, exemplary communication devices 304 comprise a land-line or VoIP telephone 316. According to embodiments each of one or more communication devices 304 are configured to communicate with one or more other communication devices 304, server 306, and/or network 150 over one or more communication links 320*a*-320*d*, 322*a*-322*d*, and 324.

Computer systems 310, tablet-type devices 312, smartphones 314, and land-line or VoIP telephones 316 may comprise a processor, memory and data storage. The processor may execute an operating system program stored in memory to control the overall operation of the computer systems 310, tablet-type devices 312, and/or smartphones 314. For example, the processor may control the reception of signals and the transmission of signals within communication network 100. The processor may execute other processes and programs resident in memory, such as, for example, registration, identification or communication over one or more communication channels 402*a*-402*n* and move data into or out of the memory, as required by an executing process.

According to embodiments, communication devices 304 of exemplary communication system 302 may be assigned one or more identification numbers, such as, for example, IP addresses, serial numbers, or telephone numbers that may be used to identify communication devices 304. According to some embodiments, each of communication devices 304 is associated with a single identification number, such as an IP or MAC address. In addition, or as an alternative, exemplary communication system 302 may be local to, or remote from, one or more customer systems 130 and one or more service centers 140. That is, customer system communication devices 134 may communicate with service center communication devices 148. For example, ticket assignment system 110 is programmed to monitor and analyze communication activity via one or more communication channels 402*a*-402*n*, such as, for example, telephone calls, emails, instant, chat or text messaging, and other like communication activity of one or more customer systems 130 and one or more service centers 140.

Those skilled in the art will recognize that one or more specific examples of exemplary communication systems 302 are given by way of example and that for simplicity and clarity, only so much of the construction and operation of exemplary communication system 302 as is necessary for an understanding of the present invention is shown and described. Moreover, it is understood that exemplary communication system 302 should not be construed to limit the types of devices in which embodiments of the present invention may be implemented. For example, exemplary communication system 302 may include other suitable exemplary communication devices 304, including, but not limited to, conventional cellular or mobile telephones, smart mobile phones, an IPHONE™, an IPAD™, wireless tablet devices, paging devices, personal digital assistant devices, short message service (SMS) wireless devices, portable computers, or other device capable of wireless or network communication.

Figure 4:
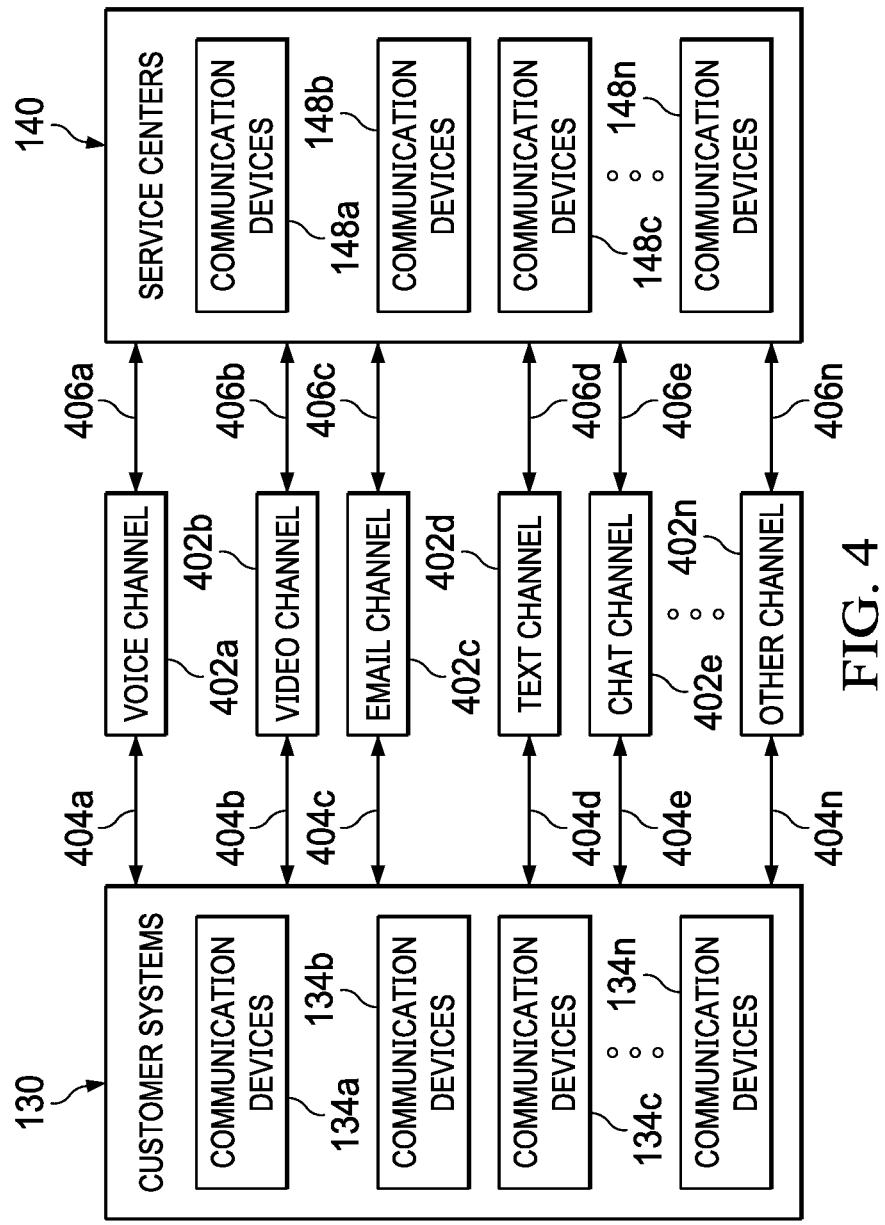
FIG. 4 illustrates one or more communication channels associated with one or more customer systems and one or more service centers, according to an embodiment.

FIG. 4 illustrates one or more communication channels 402*a*-402*n* associated with one or more customer systems 130 and one or more service centers 140, according to an embodiment. As discussed above, customer system communication devices 134 may communicate with service center communication devices 148 via one or more communication channels 402*a*-402*n*. One or more users associated with one or more customer systems 130 may communicate with one or more agents of one or more service centers 140 over various communication channels 402*a*-402*n*. As described herein, communication channels 402*a*-402*n* may include one or more communication links 404*a*-404*n* and 406*a*-406*n*, which may be any wireline, wireless, or other link suitable to support data communication among one or more customer systems 130, one more service centers 140, network 150, and/or one or more additional networked communication systems, including, for example, one or more networked computer systems supporting voice communication channel 402*a*, video communication channel 402*b*, email communication channel 402*c*, text communication channel 402*d*, chat communication channel 402*e*, and any one or more additional other communication channels 402n. As an example only and not by way of limitation, a user of one or more customer system communication devices 134a-134n may use a cell phone or land line to communicate with an agent of one or more service centers 140 using voice communication channels 402a to inquire about various subscription service issues. On another occasion, the same user may use another one or more customer system communication devices 134a-134n to communicate with a different agent using a different one or more communication channels 402a-402n to inquire about other subscription service issues. Although, particular one or more customer system communication devices 134a-134n, particular one or more service center communication devices 148a-148n, and particular one or more communication channels 402a-402n are shown and described, embodiments contemplate any number of users associated with any one or more customer system communication devices 134a-134n, any number of agents associated with any one or more service center communication devices 148a-148n over any communication channels 402a-402n, according to particular needs.

Communication network 100 may leverage the identity of communication devices 304 and the communication activity over communication channels 402a-402n for communication devices 304 to collect information about communication activity between one or more customer systems 130 and one or more service centers 140, as described above.

Figure 5:
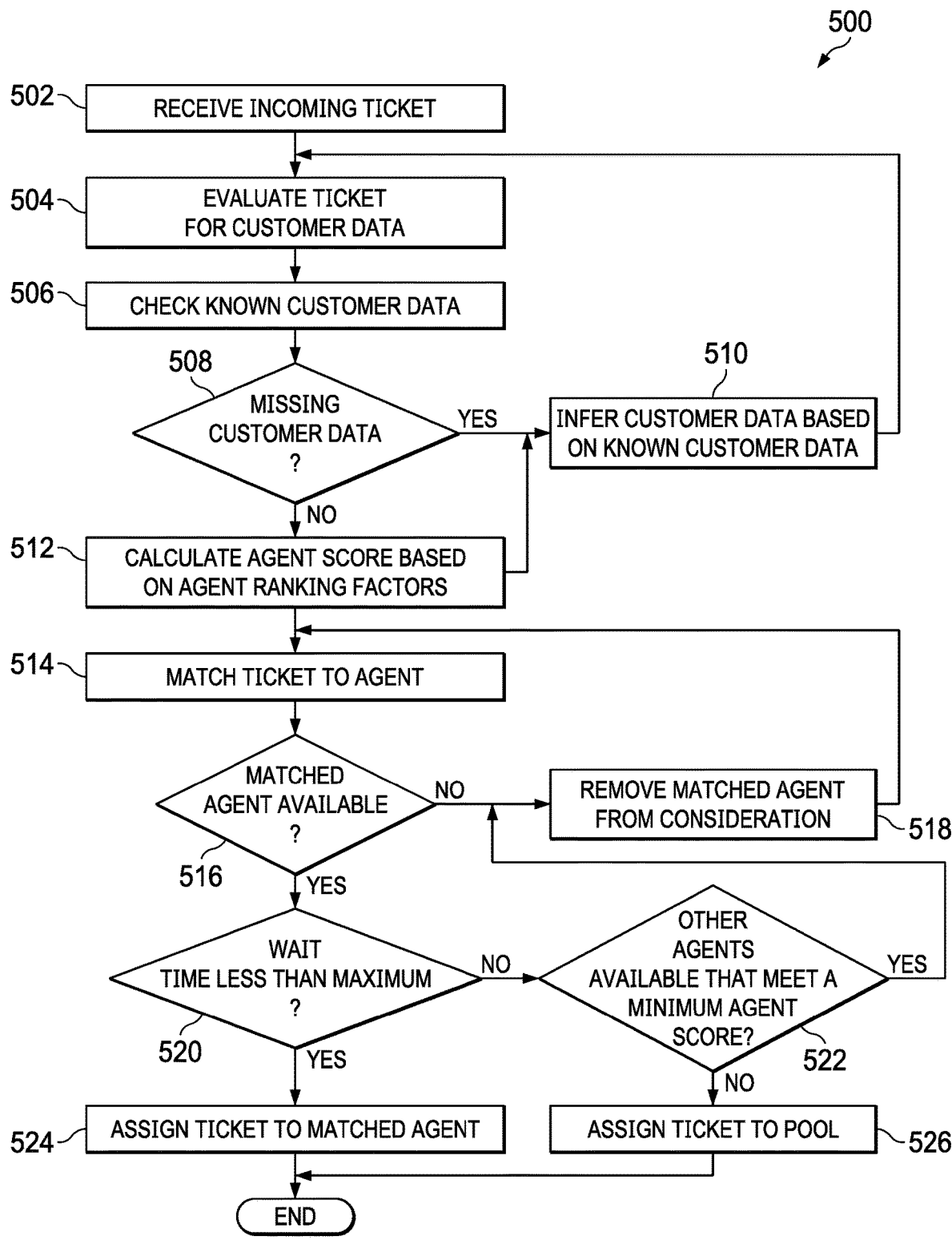
FIG. 5 illustrates an exemplary method of assigning a ticket to an agent, according to an embodiment.

FIG. 5 illustrates exemplary method 500 of assigning a ticket to an agent, according to an embodiment. Method 500 proceeds by one or more activities, which although described in a particular order may be performed in one or more permutations, according to particular needs.

Method 500 begins at activity 502 where administration module 210 of ticket assignment system 110 receives an incoming ticket. As stated above, a ticket is associated with an inbound communication to one or more service centers 140. By way of example only and not by limitation, embodiments contemplate one or more service centers 140 comprising, for example, a call center or a retail service desk which sold, serviced, or otherwise provides subscription services to customers associated with one or more customer systems 130. Such subscription services may include, for example, a cloud-based email or voice-over-internet-protocol (VOIP) service. Although particular services are described as subscription services, embodiments contemplate other services or relationships between customers associated with one or more customer systems 130 and entities associated with one or more service centers 140. Method 500 begins at activity 502 where administration module 502 of ticket assignment system 110 receives an open or unresolved ticket. Continuing with the above example, a customer associated with one or more customer systems 130 may initiate a communication to one or more service centers 140, which connects the customer's customer system communication device 134 of one or more customer systems 130 with an agent associated with a service center communication device 148 of one or more service centers 140. For example, the customer may call one or more service centers 140 to inquire about a particular issue, such as, for example, inquiring how to reset a password of a web-based email program. When one or more service centers 140 receives the customer's communication, channel interface module 212 identifies the communication channels 402a-402n as being a voice communication channels 402a-402n 402a initiated by the telephone call and generates an open or unresolved ticket by, for example, reopening a previously closed or solved ticket and/or creating a new ticket.

At activity 504, administration module 210 evaluates the ticket for customer data 234. According to embodiments, and as discussed above, administration module 210 may check whether ticket comprises identifiable customer data 234. In addition, and also as discussed above, embodiments contemplate communication processing module 216 evaluating one or more communications associated with the ticket and identifying customer data 234 using natural language processing or keyword searching to analyze the open or unresolved tickets. Continuing with the previously-described example of a customer inquiring about a password reset of a web-based email program, administration module 210 and/or communication processing module 216 may identify customer data 234 associated with the call, search for tickets associated with the identified customer, and generate a new ticket or reopen an old ticket for the customer.

At activity 506, administration module 210 checks any customer data 234 identified in the ticket against records of known customer data 250. When the customer data 234 of the ticket matches known customer data 250, administration module 210 identifies the customer associated with the matching known customer data 250. For example, when the identified customer data 234 comprises Jane Smith, which is a first and last name of a customer, administration module 210 searches known customer data 250 for a first name and a last name matching the identified customer data 234.

At activity 508, administration module 210 checks whether customer data 234 comprises missing customer data 252 for the matched customer. When administration module 210 identifies missing customer data 252 for the matched customer, method 500 continues to activity 510 where data inference module 214 generates inferred customer data 254 for missing customer data 252 based on known customer data 250.

According to embodiments, data inference module 214 checks one or more relationship models 238 that define a relationship for the missing customer data 252 and known customer data 250. When data inference module 214 identifies one or more relationship models 238 for the missing customer data 252, data inference module 214 generates inferred customer data 254. In addition, and as described above, embodiments contemplate one or more relationship models 238 that identify or calculate inferred customer data 254 based on any known, missing, or inferred service center data 230, agent data 232, other communication data 234, ticket data 236, relationship models 238, communication data 240, and/or agent ranking factors 242. Continuing with the previous example, when administration module 210 searches known customer data 210 for Jane Smith, administration module 210 may identify one or more records of missing customer data 252 for Jane Smith. For example, missing customer data 252 may comprise education level and age but known customer data 252 comprises Jane Smith's SSN. In addition, communication processing module 216 may generate education level by analyzing a transcript of Jane Smith's telephone call. Based on the relationship models 228 defining a relationship between age and SSN and an evaluation of a transcript and education level, data inference module 214 may determine that Jane Smith is a college graduate and is thirty-five years old.

After generating inferred customer data 254, administration module 210 may return to activity 504 and evaluate ticket for customer data 234 that includes the newly-added inferred customer data 254. Returning to activity 508, when administration module 210 determines that customer data 234 does not comprise missing customer data 252 for the identified customer, method 500 continues to activity 512, where scoring module 218 calculates one or more agent scores based on at least one of one or more agent ranking factors 242. As described above, one or more agent ranking factors 242 may include, for example, age, race, religion, gender, highest level of education, annual income, a pleasantness score, tone of voice, a customer engagement score, a ticket completion speed, customer feedback score, a percentage of re-opened tickets, knowledge of a topic, other demographics, a score calculated based on any one or more of the foregoing factors, and the like. One or more agents are scored based on their agent skill score for the topic of Jane Smith's telephone call (password reset of a web-based email program) and their similarity in education level, age, and one or more other agent ranking factors 242, as described above.

At activity 514, assignment module 220 matches an agent to the ticket based on the calculated agent score. According to one embodiment, the agent matched to the ticket is the agent with the greatest skill in handling the topic of the ticket and the most similarity to the customer. Here, the agent would preferably be around thirty-five and also a college graduate.

At activity 516, channel interface module 212 determines whether the matched agent is available to attend to the customer issue identified in the ticket. When channel interface module 212 determines the matched agent is not available to attend to the ticket, method 500 continues to activity 518, where administration module 210 removes the matched agent from consideration and repeats activity 514.

When the matched agent is available to attend to the ticket at activity 516, channel interface module 212 calculates a wait time for the agent to attend to the customer and administration module 210 check whether the wait time for the agent is less than a maximum wait time at activity 520. As an example only and not by way of limitation, a maximum wait time may be 20 seconds, 30 seconds, 1 minute, and/or up to 5 minutes. Although a particular maximum wait time is given by way of example, embodiments contemplate any particular wait time, according to particular needs.

When the wait time for the agent to attend to the customer is less than a maximum wait time, then method 500 continues to activity 524, where assignment module 220 assigns the ticket to the matched agent and the method ends.

When administration module 210 determines at activity 520 that the wait time for the matched agent exceeds the maximum wait time, method 500 continues to activity 522 where channel interface module 212 checks whether other agents are available that are identified by scoring module 218 as having an agent score greater than a minimum agent score. When channel interface module 212 determines that other agents are available that meet a minimum agent score, then method 500 continues to activity 518 where administration module 210 removes the matched agent from consideration and repeats activity 516.

When channel interface module 212 determines that no agents are available that meet the minimum agent scores 230 at activity 522, assignment module 220 assigns the ticket to a pool of next available agents and method 500 ends. According to embodiments, graphical user interface module 222 displays by a graphical user interface a ticket associated with Jane Smith on a display of a service center communication device 148 associated with one or more agents. According to embodiments, graphical user interface module 222 displays the ticket for display on communication device 148 of the agent associated with the ticket.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for assigning a ticket, comprising:
one or more customer systems comprising one or more customer communication devices communicatively connected over a network to one or more service centers comprising one or more service center communication devices, the one or more service center communication devices each corresponding to a particular agent;
a ticket assignment system comprising a server and one or more databases that retrieve data over the network from the one or more service centers and the one or more customer systems and store the data, wherein the data describes electronic communication between the one or more customer communication devices and the one or more service center communication devices;
the server coupled with the one or more databases, the server configured to host one or more runtime processes configured to:
monitor communication activity of the one or more customer communication devices and the one or more service center communication devices to determine whether a ticket has been opened between at least one of the one or more customer communication devices and the one or more service center communication devices;
responsive to a ticket being opened between the at least one of the one or more customer communication devices and the one or more service center communication devices, analyze the ticket for at least one topic and customer data, wherein analyzing the ticket further comprises:
analyze, the communication activity to identify the at least one topic of the communication activity by scoring, by natural language processing, a similarity between the at least one topic and the ticket associated with a customer, calculated as a distance metric between the at least one topic and the ticket by assigning weighted points, and by assigning the weighted points to a matched subject of the ticket, and to ticket data in connection with opening and closing the ticket, and to a matched topic of the ticket and the ticket data;
determine, using the natural language processing, triviality of subsequent one or more communications associated with the closed ticket;
prevent the closed ticket from reopening in response to determining the triviality of the subsequent one or more communications associated with the closed ticket;

search the one or more databases for missing customer data;

in response to detecting the missing customer data, identify one or more relationship models that predict a value for the missing customer data based on known customer data;

train an unsupervised deep learning model, using the one or more relationship models defining relationships between the missing customer data and the known customer data;

predict inferred customer data based on the trained unsupervised deep learning model using confidence scores of the missing customer data, the known customer data, and other inferred customer data;

calculate an agent score for at least two agents for the at least one topic, based on weighted ranking factors of agent skill, customer satisfaction, total time to resolve a closed ticket, and whether the closed ticket was reopened prior to final resolution, wherein the agent score is based, at least in part, on the predicted inferred customer data, wherein the agent score comprises matches of agent data associated with the at least two agents and the predicted inferred customer data;

assign the ticket to a matching agent based, at least in part, on the calculated agent score and a wait time of the matching agent being less than a maximum wait time;

transmit a communication over the network from the ticket assignment system to a service center communication device corresponding to the matching agent;

determine that an accuracy outcome of the matches of the agent data does not improve over time; and adjust the weighted ranking factors to improve the matches of the agent data.

2. The system of claim 1, wherein the agent score is a topic-specific agent score based, at least in part, on the at least one topic and the weighted ranking factors.

3. The system of claim 1, wherein the one or more service center communication devices is operably coupled with an electronic display, and the server is further configured to:

display the ticket on one or more service center communication devices associated with the matching agent.

4. The system of claim 3, wherein the one or more relationship models predicts a value for the missing customer data based on an inferred customer data score.

5. A method of assigning a ticket, comprising:

networking one or more customer systems comprising one or more customer communication devices with one or more service centers comprising one or more service center communication devices, the one or more service center communication devices each corresponding to a particular agent;

storing, by a ticket assignment system comprising a server in one or more databases, data retrieved over the network from the one or more service centers and the one or more customer systems that describes electronic communication between the one or more customer communication devices and the one or more service center communication devices;

monitoring, by the server, communication activity of the one or more customer communication devices and the one or more service center communication devices to determine whether a ticket has been opened between at least one of the one or more customer communication devices and the one or more service center communication devices;

in response to a ticket being opened between the at least one of the one or more customer communication devices and the one or more service center communication devices, analyzing the ticket for at least one topic and customer data, wherein analyzing the ticket further comprises:

analyzing, by the server, the communication activity to identify the at least one topic of the communication activity by scoring, by natural language processing, a similarity between the at least one topic and the ticket associated with a customer, calculated as a distance metric between the at least one topic and the ticket by assigning weighted points, and by assigning the weighted points to a matched subject of the ticket, and to ticket data in connection with opening and closing the ticket, and to a matched topic of the ticket and the ticket data;

determining, using the natural language processing, triviality of subsequent one or more communications associated with the closed ticket;

preventing the closed ticket from reopening in response to determining the triviality of the subsequent one or more communications associated with the closed ticket;

searching, by the server, the one or more databases for missing customer data;

in response to detecting the missing customer data, identifying, by the server, one or more relationship models that predicts a value for the missing customer data based on known customer data;

training, by the server, an unsupervised deep learning model, using the one or more relationship models defining relationships between the missing customer data and the known customer data;

predicting, by the server, inferred customer data based on the trained unsupervised deep learning model using confidence scores of the missing customer data, the known customer data, and other inferred customer data;

calculating, by the server, an agent score for at least two agents for the at least one topic, based on weighted ranking factors of agent skill, customer satisfaction, total time to resolve a closed ticket, and whether the closed ticket was reopened prior to final resolution, wherein the agent score is based, at least in part, on the predicted inferred customer data, wherein the agent score comprises matches of agent data associated with the at least two agents and the predicted inferred customer data;

assigning, by the server, the ticket to a matching agent based, at least in part, on the calculated agent score and a wait time of the matching agent being less than a maximum wait time;

transmitting, by the server, a communication over the network from the ticket assignment system to a service center communication device corresponding to the matching agent;

determining that an accuracy outcome of the matches of the agent data does not improve over time; and adjusting the weighted ranking factors to improve the matches of the agent data.

6. The method of claim 5, wherein the agent score is a topic-specific agent score based, at least in part, on the at least one topic and the weighted ranking factors.

7. The method of claim 5, further comprising:
displaying the ticket on one or more service center communication devices associated with the matching agent.

8. The method of claim 7, wherein the one or more relationship models predicts a value for the missing customer data based on an inferred customer data score.

9. A non-transitory computer-readable medium embodied with software for assigning a ticket, the software when executed:
networks one or more customer systems comprising one or more customer communication devices with one or more service centers comprising one or more service center communication devices, the one or more service center communication devices each corresponding to a particular agent;
stores, by a ticket assignment system comprising a server, data retrieved over the network from the one or more service centers and the one or more customer systems that describes electronic communication between the one or more customer communication devices and the one or more service center communication devices in one or more databases;
monitors, by the server, communication activity of the one or more customer communication devices and the one or more service center communication devices to determine whether a ticket has been opened between at least one of the one or more customer communication devices and the one or more service center communication devices;
in response to a ticket being opened between the at least one of the one or more customer communication devices and the one or more service center communication devices, analyzes the ticket for at least one topic and customer data, wherein analyzing the ticket further comprises:
analyzes, the communication activity to identify the at least one topic of the communication activity by scoring, by natural language processing, a similarity between the at least one topic and the ticket associated with a customer, calculated as a distance metric between the at least one topic and the ticket by assigning weighted points, and by assigning the weighted points to a matched subject of the ticket, and to ticket data in connection with opening and closing the ticket, and to a matched topic of the ticket and the ticket data;
determine, using the natural language processing, triviality of subsequent one or more communications associated with the closed ticket;
prevent the closed ticket from reopening in response to determining the triviality of the subsequent one or more communications associated with the closed ticket;
searches the one or more databases for missing customer data;
in response to detecting the missing customer data, identifies one or more relationship models that predicts a value for the missing customer data based on known customer data;
trains an unsupervised deep learning model, using the one or more relationship models defining relationships between the missing customer data and the known customer data;
predicts inferred customer data based on the trained unsupervised deep learning model using confidence scores of the missing customer data, the known customer data, and other inferred customer data;
calculates an agent score for at least two agents for the at least one topic, based on weighted ranking factors of agent skill, customer satisfaction, total time to resolve a closed ticket, and whether the closed ticket was reopened prior to final resolution, wherein the agent score is based, at least in part, on the predicted inferred customer data, wherein the agent score comprises matches of agent data associated with the at least two agents and the predicted inferred customer data;
assigns the ticket to a matching agent based, at least in part, on the calculated agent score and a wait time of the matching agent being less than a maximum wait time;
transmits a communication over the network from the ticket assignment system to a service center communication device corresponding to the matching agent;
determine that an accuracy outcome of the matches of the agent data does not improve over time; and
adjust the weighted ranking factors to improve the matches of the agent data.

10. The non-transitory computer-readable medium of claim 9, wherein the agent score is a topic-specific agent score based, at least in part, on the at least one topic and the weighted ranking factors.

11. The non-transitory computer-readable medium of claim 9, wherein the software when executed further:
displays the ticket on one or more service center communication devices associated with the matching agent.

* * * * *